United States Patent
He et al.

(10) Patent No.: US 8,718,090 B2
(45) Date of Patent: May 6, 2014

(54) RESOURCE RESERVATION METHOD AND NODE APPARATUS

(75) Inventors: Zhiguo He, Shenzhen (CN); Bing Wu, Shenzhen (CN); Nan Meng, Shenzhen (CN); Pei Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 680 days.

(21) Appl. No.: 12/836,018

(22) Filed: Jul. 14, 2010

(65) Prior Publication Data

US 2010/0278194 A1 Nov. 4, 2010

Related U.S. Application Data

(63) Continuation of application No. PCT/CN2009/070102, filed on Jan. 12, 2009.

(30) Foreign Application Priority Data

Jan. 30, 2008 (CN) .......................... 2008 1 0000294

(51) Int. Cl.
*H04J 3/16* (2006.01)
*H04J 3/22* (2006.01)
*H04J 1/16* (2006.01)
*H04J 3/14* (2006.01)
*H04W 4/00* (2009.01)
*H04L 12/28* (2006.01)

(52) U.S. Cl.
USPC ............ 370/468; 370/252; 370/329; 370/431

(58) Field of Classification Search
USPC .................................. 370/252, 329, 431, 468
See application file for complete search history.

(56) References Cited

U.S. PATENT DOCUMENTS

| | | |
|---|---|---|
| 6,765,927 B1 | 7/2004 | Martin et al. |
| 6,771,661 B1 * | 8/2004 | Chawla et al. ................ 370/468 |
| 2003/0093526 A1 * | 5/2003 | Nandagopalan et al. ..... 709/225 |
| 2008/0013557 A1 | 1/2008 | Siemens et al. |
| 2009/0151009 A1 * | 6/2009 | Beser .............................. 726/30 |

FOREIGN PATENT DOCUMENTS

| | | |
|---|---|---|
| CN | 1205604 | 1/1999 |
| CN | 1633106 | 6/2005 |
| CN | 101094153 | 12/2007 |
| CN | 101499954 | 6/2012 |
| EP | 0841763 | 5/1998 |

OTHER PUBLICATIONS

Wroclawski Mit LCS J, "The Use of RSVP with IETF Integrated Services" rfc2210.txt, Sep. 1, 1997, IETF Standard, Internet Engineering Task Force, pp. 1-34.

(Continued)

*Primary Examiner* — Ronald Abelson
(74) *Attorney, Agent, or Firm* — Staas & Halsey LLP

(57) ABSTRACT

A resource reservation method, a message sending method, a message receiving method, and a node apparatus in the field of network communication technology are provided. The resource reservation method includes the following steps. A resource reservation request message is received. A resource reservation value and additional accuracy information of the resource reservation value are recorded in the message. Bandwidth resources are reserved for a source node according to the additional accuracy information and the resource reservation value. Thus, resources can be reserved accurately and traffic loss caused by accuracy loss of reservation resources in the case of high traffic is avoided.

6 Claims, 2 Drawing Sheets

(56) References Cited

OTHER PUBLICATIONS

Cisco Press, "Bandwidth Management", CCSP Self-Study: Cisco Secure Virtual Private Networks, (CSVPN), Internet Article, May 31, 2004, pp. 1-5.
European Office Action dated Jun. 28, 2011 in corresponding European Patent Application 09707920.6.
Written Opinion of the International Search Authority mailed Mar. 19, 2009 in corresponding International Patent Application PCT/CN2009/070102.
Wroclawski, J., *The Use of RSVP with IETF Integrated Serives*, Network Working Group, MIT LCS, Sep. 1997, pp. 1-33.
International Search Report, dated Mar. 19, 2009, in corresponding International Application PCT/CN2009/070102 (6 pp.).

\* cited by examiner

| 0 | 7 | 15 | 23 | 31 |
|---|---|---|---|---|
| Flowspec length | | | Reserved | Version |
| Controlled-load length | | Reserved | 0 | Service amount |
| Parameter length | | Parameter marker | | Parameter identifier |
| Token Bucket Rate ||||| 
| Token Bucket Size ||||| 
| Peak data rate ||||| 
| Minimum policed unit ||||| 
| Maximum packed size |||||

RESOURCE RESERVATION METHOD AND NODE APPARATUS

CROSS-REFERENCE TO RELATED APPLICATIONS

This application is a continuation of International Application No. PCT/CN2009/070102, filed on Jan. 12, 2009, which claims priority to Chinese Patent Application No. 200810000294.2, filed on Jan. 30, 2008, both of which are hereby incorporated by reference in their entireties.

FIELD OF THE TECHNOLOGY

The present invention relates to the field of network communication technology, and more particularly to a resource reservation method, a message sending method, a message receiving method, and a node apparatus.

BACKGROUND OF THE INVENTION

The Resource Reservation Protocol (RSVP) is a Multiprotocol Label Switch (MPLS) technology. The RSVP includes a set of messages, objects, and related processing.

In the RSVP, resource reservation is requested for a single flow. During resource reservation, an upstream router requests a downstream router to reserve resources by sending a message, and the downstream router confirms that resource reservation succeeds by sending a message. Usually, the upstream router requests the downstream router to reserve resources by sending a Path message, and the downstream router confirms that resource reservation succeeds by sending a resource reservation (Resv) message.

Generally speaking, a resource reservation request of the RSVP includes a flow descriptor, which is usually represented by a (FLOWSPEC, FILTER_SPEC) pair. The FLOWSPEC indicates quality of service (QoS) to be satisfied, so as to perform packet scheduling at a node. The FILTER_SPEC is adapted to classify received data packets according to the QoS.

A bandwidth reservation method is provided in the conventional solution. In the method, a label switched path (LSP) is created and bandwidth reservation is requested through a Path message of the RSVP Traffic Engineering (TE) Protocol, which is specifically implemented as follows. A source node sends a Path message to request a target node to reserve bandwidth. A desired bandwidth value to be reserved is usually set in a SENDER_TESPEC object in the Path message. The target node reserves bandwidth for the source node according to the SENDER_TESPEC object, carries a reserved bandwidth value in a FLOWSPEC object in the Resv message, and sends the Resv message to the source node to indicate that the resource reservation succeeds. The FLOWSPEC object of the RSVP TE Protocol inherits the FLOWSPEC object of the RSVP protocol, which is specifically shown in FIG. 1. In the RSVP TE, a Token Bucket Rate field is usually adopted to represent resource reservation information, and a unit of the field is byte and a type thereof is float.

During the development of the present invention, the inventors find that the conventional solution at least has the following problems.

1. In the conventional solution, a data type of reserved bandwidth is configured to be an integer type, and the reserved bandwidth usually occupies 32 bits. However, during transmission in the conventional solution, the configured reserved bandwidth needs to be converted into a float type. At this time, for the reserved bandwidth represented by the float type, accuracy loss may occur due to an insufficient bit length, resulting in inaccurate bandwidth reservation of the target node.

2. As forwarding capability of an existing mainstream core router is up to a Gbps or Tbps magnitude, overflow occurs when a bandwidth with a Gbps or Tbps magnitude occupies 32 bits in the conventional solution, also resulting in inaccurate bandwidth reservation of the target node.

SUMMARY OF THE INVENTION

In order to solve the foregoing technical problems, in an embodiment, the present invention provides a resource reservation method, which includes the following steps.

A target node receives a resource reservation request message, and a resource reservation value and additional accuracy information of the resource reservation value are recorded in the message.

A target node reserves bandwidth resources for the source node according to the additional accuracy information and the resource reservation value.

In an embodiment, the present invention further provides a message sending method, which includes the following steps.

A resource reservation request message is sent to a target node, and a resource reservation value and additional accuracy information of the resource reservation value are set in the message.

In an embodiment, the present invention provides a message receiving method, which includes the following steps.

A resource reservation request message sent by a source node is received. Bandwidth resources are reserved for the source node according to additional accuracy information and a resource reservation value carried in the message. A resource reservation success confirmation message is sent to the source node. A bandwidth resource reservation value and additional accuracy information of the bandwidth resource reservation value are set in the message.

In an embodiment, the present invention provides a node apparatus, which includes a first extension unit and a first sending unit.

The first extension unit is adapted to record a desired resource reservation value and additional accuracy information of the resource reservation value in a resource reservation request message.

The first sending unit is adapted to send the resource reservation request message obtained by the first extension unit to a target node apparatus.

In an embodiment, the present invention provides a node apparatus, which includes a receiving unit, a reservation unit, and a second extension unit.

The receiving unit is adapted to receive a resource reservation request message, in which a resource reservation value and additional accuracy information of the resource reservation value are carried in the message.

The reservation unit is adapted to determine bandwidth resources reserved for a source node apparatus according to the additional accuracy information and the resource reservation value carried in the message.

The second extension unit is adapted to record a bandwidth resource reservation value and additional accuracy information of the bandwidth resource reservation value in a resource reservation success confirmation message.

The technical solutions have the following advantages or beneficial effects.

1. In the embodiments of the present invention, a resource reservation value and additional accuracy information of the resource reservation value are set in a resource reservation request message, so desired reservation resources can be sent to a target node at higher accuracy. The target node determines a resource value reserved for a source node apparatus according to the additional accuracy information and the resource reservation value carried in the resource reservation request message, so that the target node can reserve resources accurately. Thus, traffic loss caused by accuracy loss of reservation resources (for example, bandwidth) in the case of high traffic is prevented.

2. In the embodiments of the present invention, a resource reservation value and additional accuracy information of the resource reservation value are set in the resource reservation request message, so the desired reservation resources can be sent to the target node at higher accuracy. Thus, the target node can reserve corresponding resources for the source node accurately.

3. In the embodiments of the present invention, the determined resource reservation value and additional accuracy information of the resource reservation value are set in a reservation success confirmation message returned to the source node, so the resource information reserved by the source node and the target node can keep consistent. Thus, the target node can reserve resources for the source node more accurately.

DETAILED DESCRIPTION OF THE EMBODIMENTS

Figures 1, 2:
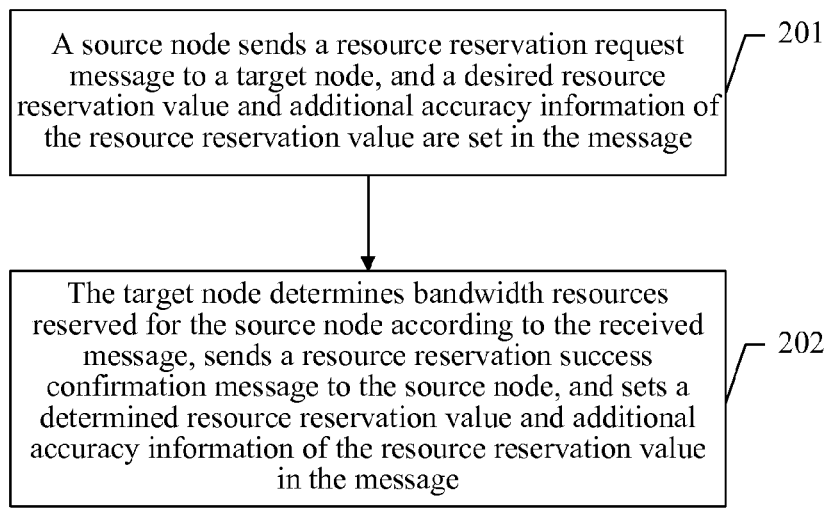
FIG. 1 shows a packet format of a FLOWSPEC object in the conventional solution.
FIG. 2 is a flow chart of a resource reservation method according to a first embodiment of the present invention.

First, a Resv message is extended, which includes the following implementation modes.

In a first mode, a FLOWSPEC object of the Resv message is extended. Additional accuracy information, for example, a data type and unit information, of Token Bucket Rate data is added in the object. A reserved field in the second 4-byte of the FLOWSPEC object is used to carry the added data type and unit information. The unit information includes a unit type and a data unit of the Token Bucket Rate. The second 4-byte reserved field is as shown in Table 1.

TABLE 1

| First bit | Second bit | Third bit | Fourth bit | Fifth bit | Sixth bit | Seventh bit |
| --- | --- | --- | --- | --- | --- | --- |

The first bit is used to represent a data type of the Token Bucket Rate. For example, the first bit is set to 0 to represent a float type and set to 1 to represent an integer type.

The second bit is used to represent a unit type of the Token Bucket Rate. For example, the second bit is set to 0 to represent that the unit type is a byte type and set to 1 to represent that the unit type is a bit type.

The third, fourth, fifth, sixth, and seventh bits are used to represent a data unit of the Token Bucket Rate. For example, the third, fourth, fifth, sixth, and seventh bits are set to 00000 to represent Byte per second (Bps) or bit per second (bps), set to 00001 to represent KByte per second (KBps) or Kbit per second (Kbps), set to 00010 to represent MByte per second (MBps) or Mbit per second (Mbps), set to 00011 to represent GByte per second (GBps) or Gbit per second (Gbps), and set to 00100 to represent TByte per second (TBps) or Tbit per second (Tbps).

In a second mode, the FLOWSPEC object of the Resv message is extended. Additional accuracy information, for example, a unit type and a data type, of the Token Bucket Rate data is added in the object. A bit in a reserved field in the second 4-byte of the FLOWSPEC object is used to represent a unit type. For example, the bit is set to 0 to represent that the unit type is a byte type and set to 1 to represent that the unit type is a bit type. Another bit in the reserved field is used to represent whether to carry information as a data type. For example, the bit is set to 1 to represent to carry the information as an integer type, and if the type of configured reservation resources is a float type, the reservation resources need to be converted into information as integer type at this time; the bit is set to 0 to represent to carry the information as original data type (for example, a floating point number).

In a third mode, a packet of the FLOWSPEC object is extended. Four bytes are added, and 7 bits in the four bytes are used to represent additional accuracy information, for example, a data type and unit information. In the third mode, the additional accuracy information can be represented in the mode same as the first mode or second mode.

In the fourth mode, an object is added in the Resv message, and a resource reservation value and additional accuracy information of the resource reservation value are added in the object. A packet format of the added object can be referred to Table 2.

TABLE 2

| Bandwidth Length | |
| --- | --- |
| The value needs to be set to 0 | Accuracy |

It should be noted that, for the Token Bucket Rate in the SENDER_TESPEC object in the Path message, accuracy loss might also occur. The extension mode for the Resv message can be adopted to extend the Path message. For example, the additional accuracy information of the desired resource reservation value is carried in the reserved field of the SENDER_TESPEC object, the additional accuracy information of the resource reservation value is carried in the extended SENDER_TESPEC object field, or the desired resource reservation value and the additional accuracy information of the resource reservation value are carried in an added object.

In a first embodiment, the present invention provides a resource reservation method, the method flow of which is as shown in FIG. 2. The method includes the following steps.

In Step 201, a source node sends a resource reservation request message to a target node. A desired resource reservation value and additional accuracy information of the desired resource reservation value are set in the message. The set additional accuracy information is a data type and/or unit information of the desired resource reservation value. The data type can be a float type or an integer type. The unit information may be Bps, KBps, MBps, GBps or TBps, and may also be bps, Kbps, Mbps, Gbps or Tbps.

In Step 202, the target node determines bandwidth resources reserved for the source node according to the desired resource reservation value and the additional accuracy information, sends a resource reservation success confirmation message to the source node, and sets a determined bandwidth resource reservation value and additional accuracy information of the determined bandwidth resource reservation value in the message.

The step in which the target node determines the bandwidth resources reserved for the source node according to the desired bandwidth resource reservation value and the additional accuracy information includes the following circumstances.

1). It is assumed that the set additional accuracy information is a data type and unit information, for example, the set data type is an integer type and the data unit is kbps. When the set desired bandwidth resource reservation value is 1024, it can be determined that the bandwidth resources reserved for the source node are 1024 kbps. When the set desired bandwidth resource reservation value is 1.024, it can be determined that the resources reserved for the source node are 1.024 kbps=1.024×10$^3$ bps=1024 bps.

2). It is assumed that the set additional accuracy information is a data type. If the data type is a float type, in order to avoid accuracy loss of the float type, the data unit can be set to a default value such as KBps, Kbps, MBps, Mbps, GBps, Gbps, TBps or Tbps. When the desired bandwidth resource reservation value is 1.024, the value is combined with the default data unit to obtain bandwidth resources to be reserved for the source node, for example, 1.024 kbps=1.024×10$^3$ bps=1024 bps, so that the accuracy information of the float type can be avoided. If the data type is an integer type, the data type does not need to be converted, and the target node can determine the bandwidth resources to be reserved for the source node according to a combined value of the desired bandwidth resource reservation value and the default data unit.

3). It is assumed that the set additional accuracy information is a unit type of the bandwidth resource data to be reserved. If the unit type is a byte, the data unit can be set to a default value, such as KBps, MBps, GBps or TBps. When the bandwidth resource reservation value is 1.024, the value and the default data unit are combined to obtain bandwidth resources to be reserved for the source node, for example, 1.024 kbps=1.024×10$^3$ bps=1024 bps, so that accuracy information of the float type can be avoided. If the unit type is an integer type, the data type does not need to be converted, and the target node can determine the resources to be reserved for the source node according to a combined value of the desired resource reservation value and the default data unit.

As can be seen from above, in the embodiments of the present invention, the desired resource reservation value and the additional accuracy information of the desired resource reservation value are set in the resource reservation request message, so the bandwidth resources to be reserved can be sent to the target node at higher accuracy. The target node determines the reserved bandwidth resources for the source node according to the resource reservation request message, so that the target node can reserve the bandwidth resources accurately. Thus, traffic loss caused by accuracy loss of reservation resources (for example, bandwidth) in the case of high traffic is prevented.

In addition, in the embodiments of the present invention, the determined resource reservation value and the additional accuracy information of the determined resource reservation value are set in the reservation success confirmation message returned to the source node, so the resource information reserved by the source node and the target node is consistent. Thus, the target node can reserve resources for the source node more accurately.

In a second embodiment, the present invention provides a message sending method, which includes the following steps.

A resource reservation request message is sent to a target node, and a desired resource reservation value and additional accuracy information of the desired resource reservation value are set in the message.

Optionally, the additional accuracy information of the resource reservation value is carried in a reserved field of a SENDER_TESPEC object or an added SENDER_TESPEC object field.

Optionally, the resource reservation value and the additional accuracy information of the resource reservation value are carried in an added object.

As can be seen from above, in this embodiment, the desired resource reservation value and the additional accuracy information of the desired resource reservation value are set in the resource reservation request message, so that the desired reservation resource can be sent to the target node at higher accuracy. Thus, the target node can reserve corresponding resources for the source node accurately.

In a third embodiment, the present invention provides a message receiving method, which includes the following steps.

A resource reservation value for a source node is determined according to a resource reservation request message sent by the source node, and a resource reservation success confirmation message is sent to the source node. A determined resource reservation value and additional accuracy information of the determined resource reservation value are set in the message.

Optionally, the additional accuracy information of the resource reservation value is carried in a reserved field of the FLOWSPEC object or an added FLOWSPEC object field.

Optionally, the desired resource reservation value and additional accuracy information of the resource reservation value are carried in an added object.

As can be seen from above, in this embodiment, the determined resource reservation value and the additional accuracy information of the determined resource reservation value are set in the reservation success confirmation message returned to the source node, so that the resource information reserved for the source node and the target node is consistent. Thus, the target node can reserve resources for the source node accurately.

Persons of ordinary skill in the art should understand that all or a part of the steps of the method according to the embodiments may be implemented by a program instructing relevant hardware. The program may be stored in a computer readable storage medium. When the program is run, the following steps are performed.

A target node receives a resource reservation request message, and a desired resource reservation value and additional accuracy information of the desired resource reservation value are recorded in the message.

The target node reserves bandwidth resources for a source node according to the additional accuracy information and the desired resource reservation value.

When one program is run, the following step is performed.

A resource reservation request message is sent to a target node, and a desired resource reservation value and additional accuracy information of the desired resource reservation value are set in the message.

When one program is run, the following steps are performed.

A resource reservation request message sent by a source node is received. According to additional accuracy information and a resource reservation value carried in the message, bandwidth resources are reserved for the source node. A resource reservation success confirmation message is sent to the source node. A determined bandwidth resource reservation value and additional accuracy information of the determined bandwidth resource reservation value are set in the confirmation message.

The storage medium may be a read only memory (ROM), a random access memory (RAM), a magnetic disk, or an optical disk.

Figure 3:
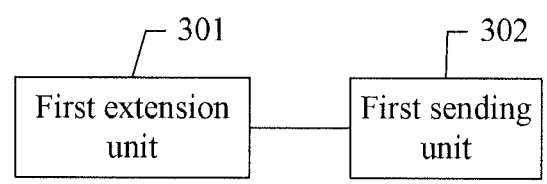
FIG. 3 is a schematic view of a node apparatus according to a fourth embodiment of the present invention.

In a fourth embodiment, the present invention provides a node apparatus. Referring to FIG. 3, the apparatus includes a first extension unit 301 and a first sending unit 302.

The first extension unit 301 is adapted to extend a resource reservation request message, in which a desired resource reservation value and additional accuracy information of the desired resource reservation value are recorded in the message.

The first sending unit 302 is adapted to send the resource reservation request message obtained by the first extension unit 301 to a target node apparatus.

Optionally, the additional accuracy information recorded in the resource reservation request message by the first extension unit 301 is a data unit of bandwidth resources to be reserved.

Optionally, the additional accuracy information recorded in the resource reservation request message by the first extension unit 301 is a data type and/or a unit type of bandwidth resources to be reserved.

As can be seen from above, in this embodiment, the desired resource reservation value and the additional accuracy information of the desired resource reservation value are set in the resource reservation request message, so that the desired reservation resource can be sent to the target node at higher accuracy. Thus, the target node can reserve corresponding resources for the source node accurately.

Figure 4:
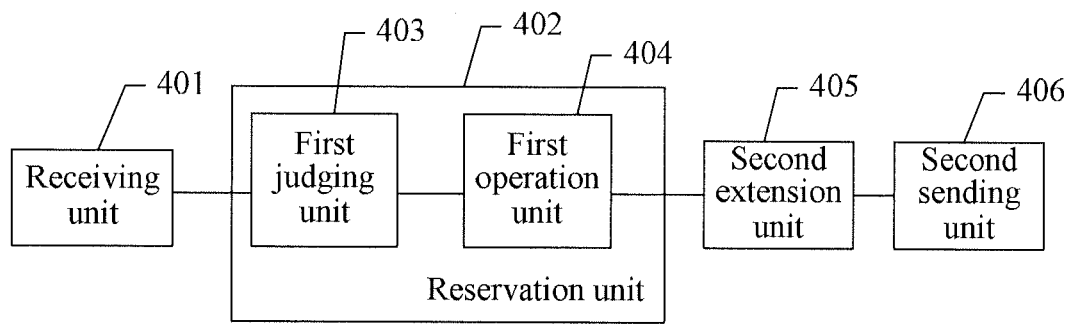
FIG. 4 is a schematic view of a node apparatus according to a fifth embodiment of the present invention.

In a fifth embodiment, the present invention provides a node apparatus. Referring to FIG. 4, the apparatus includes a receiving unit 401 and a reservation unit 402.

The receiving unit 401 is adapted to receive a resource reservation request message, in which a desired resource reservation value and additional accuracy information of the desired resource reservation value are carried in the message.

The reservation unit 402 is adapted to determine bandwidth resources reserved for a source node apparatus according to the additional accuracy information and the desired resource reservation value carried in the message.

The second extension unit 405 is adapted to extend a resource reservation success confirmation message, and set a determined resource reservation value and additional accuracy information of the determined resource reservation value in the confirmation message.

The second sending unit 406 is adapted to send the resource reservation success confirmation message obtained by the second extension unit 405 to the source node apparatus.

Optionally, when the additional accuracy information received by the receiving unit 401 is a data unit of bandwidth resources to be reserved, the reservation unit 402 includes a first judging unit 403 and a first operation unit 404.

The first judging unit 403 is adapted to judge whether a data type of the desired resource reservation value is a float type or an integer type.

The first operation unit 404 is adapted to combine the desired resource reservation value and the data unit when the data type is the float type and convert the combined value into a resource reservation value for the source node, and combine the desired resource reservation value and the data unit into a resource reservation value for the source node when the data type is the integer type.

Optionally, when the additional accuracy information received by the receiving unit 401 is a data type and/or a unit type of bandwidth resources to be reserved, the reservation unit 402 includes an obtaining unit, a second judging unit, and a second operation unit.

The obtaining unit is adapted to obtain a default data unit.

The second judging unit is adapted to judge whether the data type of the desired resource reservation value is a float type or an integer type.

The second operation unit is adapted to combine the desired resource reservation value and the default data unit when the data type is the float type and convert the combined value into a resource reservation value for the source node, and combine the desired resource reservation value and the default data unit into a resource reservation value for the source node when the data type is the integer type.

As can be seen from above, in this embodiment, the determined resource reservation value and the additional accuracy information of the resource reservation value are set in the reservation success confirmation message returned to the source node, so that the resource information reserved by the source node and the target node is consistent. Thus, the target node can reserve resources for the source node more accurately.

What is claimed is:

1. A resource reservation method, comprising:
   receiving a resource reservation request message, wherein a desired resource reservation value and additional accuracy information of the desired resource reservation value are carried in the message; and
   reserving bandwidth resources for a source node according to the additional accuracy information and the desired resource reservation value,
   wherein when the additional accuracy information is a data type and a data unit of bandwidth resources to be reserved, the reserving the bandwidth resources for the source node according to the additional accuracy information and the desired resource reservation value comprises:
   judging whether the data type of the desired resource reservation value is a float type or an integer type, wherein when the data type is the float type, the desired resource reservation value and the data unit are combined, and a combined value is converted into a resource reservation value for the source node, and when the data type is the integer type, the desired resource reservation value and the data unit are combined into a resource reservation value for the source node.

2. The method according to claim 1, wherein after the reserving the bandwidth resources for the source node, the method further comprises:
   sending a resource reservation success confirmation message to the source node, wherein a determined resource reservation value and additional accuracy information of the determined resource reservation value are carried in the confirmation message.

3. A resource reservation method, comprising:
   receiving a resource reservation request message, wherein a desired resource reservation value and additional accuracy information of the desired resource reservation value are carried in the message; and
   reserving bandwidth resources for a source node according to the additional accuracy information and the desired resource reservation value, wherein when the additional accuracy information is a data type of bandwidth resources to be reserved, the reserving the bandwidth resources for the source node according to the additional accuracy information and the desired resource reservation value comprises:

acquiring a default data unit; and judging whether the data type of the desired resource reservation value is a float type or an integer type, wherein when the data type is the float type, the desired resource reservation value and the default data unit are combined, and a combined value is converted into a resource reservation value for the source node, and when the data type is the integer type, the desired resource reservation value and the default data unit are combined into a resource reservation value for the source node.

4. The method according to claim 3, wherein after the reserving the bandwidth resources for the source node, the method further comprises:

sending a resource reservation success confirmation message to the source node, wherein a determined resource reservation value and additional accuracy information of the determined resource reservation value are carried in the confirmation message.

5. A node apparatus, comprising:

a receiving unit, configured to receive a resource reservation request message, wherein a desired resource reservation value and additional accuracy information of the desired resource reservation value are carried in the message;

a reservation unit, configured to determine bandwidth resources reserved for a source node apparatus according to the additional accuracy information and the resource reservation value carried in the message; and a second extension unit, configured to record a bandwidth resource reservation value and additional accuracy information of the bandwidth resource reservation value in a resource reservation success confirmation message, wherein the additional accuracy information received by the receiving unit is a data type and a data unit of bandwidth resources to be reserved, the reservation unit comprises:

a first judging unit, configured to judge whether the data type of the desired resource reservation value is a float type or an integer type; and a first operation unit, configured to combine the desired resource reservation value and the data unit and convert a combined value into a resource reservation value for the source node when the data type is the float type, and combine the desired resource reservation value and the data unit into a resource reservation value for the source node when the data type is the integer type.

6. A node apparatus, comprising:

a receiving unit, configured to receive a resource reservation request message, wherein a desired resource reservation value and additional accuracy information of the desired resource reservation value are carried in the message;

a reservation unit, configured to determine bandwidth resources reserved for a source node apparatus according to the additional accuracy information and the resource reservation value carried in the message; and a second extension unit, configured to record a bandwidth resource reservation value and additional accuracy information of the bandwidth resource reservation value in a resource reservation success confirmation message, wherein the additional accuracy information received by the receiving unit is a data type of bandwidth resources to be reserved, the reservation unit comprises:

an obtaining unit, configured to obtain a default data unit;

a second judging unit, configured to judge whether the data type of the desired resource reservation value is a float type or an integer type; and a second operation unit, configured to combine the desired resource reservation value and the default data unit and convert a combined value into a resource reservation value for the source node when the data type is the float type, and combine the resource reservation value and the default data unit into a resource reservation value for the source node when the data type is the integer type.

* * * * *